United States Patent
Delmotte et al.

(10) Patent No.: US 6,652,971 B1
(45) Date of Patent: Nov. 25, 2003

(54) HYDROXY-FUNCTIONAL (METH)ACRYLIC COPOLYMERS AND COATING COMPOSITION

(75) Inventors: Ann Delmotte, Groot-Bygaarden (BE); Josef Huybrechts, Oud-Turnhout (BE); Hermann Kerber, Wuppertal (DE); Olaf Ley, Wuppertal (DE); Harold Paulussen, Aarschot (BE); Ann Vaes, Leuven (BE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 339 days.

(21) Appl. No.: 09/699,645

(22) Filed: Oct. 30, 2000

(51) Int. Cl.⁷ .......................... C08F 20/00; B32B 27/30
(52) U.S. Cl. ................. 428/413; 428/416; 428/480; 428/520; 428/522; 525/327.3
(58) Field of Search ................... 525/514, 327.3; 428/413, 416, 522, 520, 480

(56) References Cited

U.S. PATENT DOCUMENTS

| | | | |
|---|---|---|---|
| 3,988,281 A | * 10/1976 | Minami et al. ............. 523/410 |
| 4,092,373 A | 5/1978 | Siwiec et al. |
| 4,546,046 A | 10/1985 | Etzell et al. |
| 5,075,370 A | 12/1991 | Kutitza et al. |
| 6,037,414 A | * 3/2000 | Simms et al. ............... 525/176 |
| 6,306,505 B1 | * 10/2001 | Mauer et al. ............... 428/413 |
| 6,340,733 B2 | * 1/2002 | Slark et al. ................. 525/303 |
| 6,342,144 B1 | * 1/2002 | December ................... 204/484 |
| 6,376,596 B1 | * 4/2002 | Barsotti et al. ............. 524/500 |

FOREIGN PATENT DOCUMENTS

EP 0 654 051 B1 9/1993

* cited by examiner

Primary Examiner—D. Lawrence Tarazano
(74) Attorney, Agent, or Firm—Hilmar L. Fricke

(57) ABSTRACT

The invention relates to hydroxy-functional (meth)acrylic copolymers having an OH value from 40 to 260 mg KOH/g, a number average molecular mass (Mn) from 1500 to 20000 g/mole and a glass transition temperature Tg from −40° C. to 80° C., containing A) polymerized monomers of at least one epoxy-functional, olefinically unsaturated monomer, B) at least one compound having a carboxyl group and at least one hydroxyl group in the molecule that is reacted with the epoxy functional group of the polymerized olefincially unsaturated monomers, C) at least one additional polymerized olefinically unsaturated monomer capable of radical polymerization which is different from component A) and D) optionally at least one lactone reacted with the polymer.

It also relates to processes for making the copolymers and to coating compositions that contain the hydroxy-functional (meth)acrylic copolymers and to the use thereof in multi-layer automotive coatings.

16 Claims, No Drawings

HYDROXY-FUNCTIONAL (METH)ACRYLIC COPOLYMERS AND COATING COMPOSITION

BACKGROUND OF THE INVENTION

1. Field of the Invention

The invention relates to hydroxy-functional (meth)acrylic copolymers and solvent-based, one-component and two-component coating compositions containing them. The invention finds application in automotive and industrial coatings.

2. Description of Related Art

In automotive coatings in particular, there is a need for coating compositions which produce flexible, scratch resistant and chemical and acid resistant coatings. It is already known from the prior art that scratch resistant coatings can be obtained by using hydroxy-functional (meth)acrylic copolymers whose hydroxyl groups are modified with lactones.

For example, coating compositions for automotive coatings that are based on epsilon caprolactone-modified (meth)acrylic copolymers and aminoplastic cross-linking agents are described in U. S. Pat. No. 4,546,046. The (meth)acrylic copolymers are prepared from carboxy-functional or hydroxy-functional unsaturated monomers, unsaturated monomers without further functionality, and epsilon caprolactone. The modification with epsilon caprolactone may be carried out in various ways: epsilon caprolactone may be added directly to the unsaturated monomers, or the addition is made only after polymerization of the unsaturated monomers. Similarly, pre-adducts of epsilon caprolactone and hydroxy-or carboxy-functional unsaturated monomers may be formed and then polymerized with further unsaturated-monomers;

Coating compositions of the binders thus prepared produce flexible coatings with good scratch resistance but insufficient acid resistance. Also, when the above-mentioned coating compositions are applied as clear coats, particularly to solvent-based base coats, the base coat is partially dissolved by the clear coat.

This invention provides hydroxy-functional binders based on (meth)acrylic copolymers which, when used in one-component and two-component coating compositions, produce flexible scratch resistant coatings with very good chemical and acid resistance. When applied as a clear coat to solvent-based base coats in particular, there is no or only a slight dissolution of the base coat.

SUMMARY OF THE INVENTION

The invention is directed to hydroxy-functional (meth)acrylic copolymers having an OH value from 40 to 260 mg KOH/g, a number average molecular mass (Mn) from 1500 to 20000 g/mole and a glass transition temperature Tg from −40° C. to 80° C., comprising polymerized monomers of at least one epoxy-functional, olefinically unsaturated monomer (component A), at least one compound having a carboxyl group and at least one hydroxyl group in the molecule that is reacted with the epoxy-functional group of the polymerized olefinically unsaturated monomers (component B), at least one additional polymerized olefinically unsaturated monomer capable of radical polymerization (component C) which is different from component A, and optionally, at least one lactone (component D) reacted with the polymer.

The invention also is directed to a process for the preparation of the hydroxy-functional (meth)acrylic copolymers, wherein the copolymer is formed by radical polymerization of epoxy functional, olefinically unsaturated monomers (component A) and at least on additional polymerizable olefinically unsaturated monomer (component C) and at least a part of the hydroxyl groups are introduced into the copolymer by reaction of the epoxy group of the epoxy-functional, olefinically unsaturated monomer (component A) with compounds having a carboxyl group and at least one hydroxyl group (component B). The hydroxyl groups introduced in this way are situated in the copolymer side chain and result from the hydroxyl groups originating from component B and the secondary hydroxyl groups obtained during the ring-opening reaction of the epoxy groups of component A) with the carboxyl groups of component B).

DETAILED DESCRIPTION OF THE EMBODIMENTS

The term (meth)acrylic as used here and hereinafter should be taken to mean methacrylic and/or acrylic.

Surprisingly, it was found that hydroxy-functional (meth)acrylic copolymers prepared in this way, when used in coating compositions, form coatings having, in particular, a balanced ratio between good acid resistance and good scratch resistance.

The hydroxy-functional (meth)acrylic copolymers contain at least one further olefinically unsaturated monomer capable of radical polymerization (component C) which is different from component A).

Preferred hydroxy-functional (meth)acrylic copolymers have an OH value from 80 to 220 mg KOH/g, a number average molecular mass Mn from 2000 to 15000 g/mole, especially preferred from 4000 to 12000 g/mole and a glass transition temperature Tg from −40° C. to 60° C. Component A) is contained preferably in an amount from 1 to 90 wt-%, component B) from 1 to 80 wt-% and component C) from 5 to 80 wt-% in the hydroxy-functional (meth)acrylic copolymers, the proportions by weight of components A), B) and C) totaling 100 wt-%.

Further preferred hydroxy-functional (meth)acrylic copolymers also contain at least one lactone (component D). The at least one lactone may be present preferably in an amount from 2 to 50 wt-%, particularly preferably 5 to 30 wt-%, based on the total amount of components A), B), C) and D), the proportions by weight of components A), B), C) and D) totaling 100 wt-%.

Examples of suitable epoxy-functional, olefinically unsaturated monomers (component A) capable of radical polymerization, hereinafter abbreviated to epoxy-functional monomers, include (meth)allyl glycidyl ether, 3,4-epoxy-1-vinylcyclohexane, epoxycyclohexyl(meth)acrylate, vinyl glycidyl ether, 2-methyl glycidyl(meth)acrylate and glycidyl (meth)acrylate. Glycidyl (meth)acrylate is used in preference.

The compounds having a carboxyl group and at least one hydroxyl group (component B) are, for example, hydroxymonocarboxylic acids having at least one hydroxyl group, preferably hydroxymonocarboxylic acids having 1 to 3 hydroxyl groups. The hydroxyl groups may be primary or secondary hydroxyl groups. The hydroxymonocarboxylic acids may be linear or branched, saturated or unsaturated. They may for example be hydroxymonocarboxylic acids having 2 to 20 carbon atoms in the molecule.

Examples of hydroxymonocarboxylic acids having one hydroxyl group are 2-hydroxyacetic acid, 2-hydroxypropionic acid, 3-hydroxypropionic acid, 2-hydroxy-2-methylpropionic acid, hydroxy-2,2-dimethylpropionic acid (hydroxypivalic acid), hydroxy-2,2-diethylpropionic acid, 2-, 3-, and 4-hydroxybutyric acid, 2-hydroxyvaleric acid, 2-hydroxycaproic acid, 2-hydroxyheptanoic acid, 2-hydroxyoctanoic acid, 12-hydroxystearic acid and ricinoleic acid. Examples of hydroxycarboxylic acids having two hydroxyl groups are dimethylol propionic acid, dimethylol butyric acid and glyceric acid. Tris-hydroxymethylacetic acid is an example of an hydroxycarboxylic acid having 3 hydroxyl groups.

Further suitable compounds having a carboxyl group and at least one hydroxyl group are reaction products of hydroxymonocarboxylic acids and lactones. The lactones undergo an addition reaction with the hydroxyl group. Suitable hydroxycarboxylic acids are those already mentioned above. Examples of suitable lactones are those containing 3 to 15 carbon atoms in the ring and where the rings may also have various substituents. Preferred lactones are gamma butyrolactone, delta valerolactone, epsilon caprolactone, beta hydroxy-beta-methyl-delta valerolactone, lambda laurinlactone or mixtures thereof. Epsilon caprolactone is particularly preferred.

Further compounds having a carboxyl group and at least one hydroxyl group are compounds which contain ester groups in addition to the carboxyl group and the at least one hydroxyl group. Such compounds C) may be obtained, for example, by reaction of the above-mentioned hydroxymonocarboxylic acids with acid anhydrides and further reaction of the compounds thus obtained with epoxy-functional compounds, e.g., olefinically unsaturated epoxy-functional compounds. Examples of suitable olefinically unsaturated epoxy-functional compounds are those mentioned above in the description of component A). Examples of suitable acid anhydrides are phthalic anhydride, hexahydrophthalic anhydride, succinic anhydride, methylhexahydrophthalic anhydride, tetrahydrophthalic anhydride and methyltetrahydrophthalic anhydride.

Further olefinically unsaturated monomers capable of radical polymerization (component C) which may be used, hereinafter abbreviated to further unsaturated monomers, are those monomers that, apart from an olefinic double bond, contain no further reactive functional groups. Examples of further suitable unsaturated monomers without further functional groups are esters of unsaturated carboxylic acids with aliphatic, monohydric branched or unbranched and cyclic alcohols having 1 to 20 carbon atoms. Examples of suitable unsaturated carboxylic acids are acrylic acid, methacrylic acid, crotonic acid and isocrotonic acid. These are preferably esters of (meth)acrylic acid. Examples of (meth)acrylic acid esters with aliphatic alcohols are methyl acrylate, ethyl acrylate, isopropyl acrylate, tert.-butyl acrylate, n-butyl acrylate, isobutyl acrylate, 2-ethylhexyl acrylate, lauryl acrylate, stearyl acrylate and the corresponding methacrylates. Examples of (meth)acrylic acid esters with cyclic alcohols are cyclohexyl acrylate, methylcyclohexyl acrylate, trimethylcyclohexyl acrylate, 4-tert.-butylcyclohexyl acrylate, isobornylacrylate and the corresponding methacrylates. Examples of (meth) acrylic acid esters with aromatic alcohols are benzyl (meth) acrylates.

Examples of further suitable unsaturated monomers without further functional groups include vinyl esters such as, e.g., vinyl acetate, vinyl propionate and vinyl esters of saturated monocarboxylic acids branched in the alpha position, e.g., vinyl esters of saturated alpha, alpha'-dialkylalkane monocarboxylic acids and vinyl esters of saturated alpha-alkylalkane monocarboxylic acids in each case having 5 to 13 carbon atoms, preferably 9 to 11 carbon atoms in the molecule.

Further highly suitable unsaturated monomers are vinylaromatic hydrocarbons, preferably those having 8 to 9 carbon atoms in the molecule. Examples of such monomers are styrene, alpha-methylstyrene, chlorostyrenes, vinyltoluenes, 2,5-dimethylstyrene, p-methoxystyrene and tertiary butylstyrene. Styrene is used in preference.

It is also possible to use small proportions of olefinically polyunsaturated monomers. These are monomers having at least 2 double bonds capable of radical polymerization. Examples thereof are divinylbenzene, 1,4-butane diol diacrylate, 1,6-hexanediol diacrylate, neopentylglycol dimethacrylate, glycerol dimethacrylate.

Further suitable unsaturated monomers are those monomers that, apart from an olefinic double bond, contain additional functional groups. Additional functional groups may be, for example, hydroxyl groups. Hydroxy-functional unsaturated monomers may be used in cases where the hydroxy-functional (meth)acrylic copolymers according to the invention are required to contain additional hydroxyl groups which are not introduced into the (meth)acrylic copolymer by reaction of the epoxy-functional unsaturated monomers (component A) with compounds having a carboxyl group and at least one hydroxyl group (component B). Examples of suitable hydroxy-functional unsaturated monomers are hydroxyalkyl esters of alpha, beta-olefinically unsaturated monocarboxylic acids having primary or secondary hydroxyl groups. Examples include the hydroxyalkyl esters of acrylic acid, methacrylic acid, crotonic acid and/or isocrotonic acid. The hydroxyalkyl esters of (meth)acrylic acid are preferred. The hydroxyalkyl radicals may contain for example, 1 to 10 carbon atoms, preferably 2 to 6 carbon atoms. Examples of suitable hydroxyalkyl esters of alpha, beta-olefinically unsaturated monocarboxylic acids having primary hydroxyl groups are hydroxyethyl (meth)acrylate, hydroxypropyl (meth)acrylate, hydroxybutyl (meth)acrylate, hydroxyamyl (meth)acrylate, and hydroxyhexyl (meth) acrylate. Examples of suitable hydroxyalkyl esters having secondary hydroxyl groups are 2-hydroxypropyl (meth)acrylate, 2-hydroxybutyl (meth)acrylate, and 3-hydroxybutyl (meth)acrylate.

Further hydroxy-functional unsaturated monomers which may be used are reaction products of alpha, beta-unsaturated monocarboxylic acids with glycidyl esters of saturated monocarboxylic acids branched in the alpha position, e.g., with glycidyl esters of saturated alpha-alkylalkane monocarboxylic acids or alpha, alpha'-dialkylalkane monocarboxylic acids. These are preferably the reaction products of (meth)acrylic acid with glycidyl esters of saturated alpha, alpha'-dialkylalkane monocarboxylic acids having 7 to 13 carbon atoms in the molecule, particularly preferably having 9 to 11 carbon atoms in the molecule. The formation of these reaction products may take place before, during or after the copolymerization reaction.

Further hydroxy-functional unsaturated monomers, which may be used, are reaction products of hydroxyalkyl (meth) acrylates with lactones. At least a part of the hydroxyalkyl esters of alpha, beta-unsaturated monocarboxylic acids described above may be modified in this way. This takes place by means of an esterification reaction, which proceeds with ring opening of the lactone. Again, hydroxyl groups in the form of hydroxyalkyl ester groups corresponding to the lactone in question are formed in the terminal position during the reaction. Examples of suitable hydroxyalkyl (meth)acrylates are those mentioned above. Examples of suitable lactones are those containing 3 to 15 carbon atoms in the ring and where the rings may also have various substituents. Preferred lactones are gamma butyrolactone, delta valerolactone, epsilon caprolactone, beta-hydroxy-beta-methyl-delta valerolactone, lambda laurinlactone or mixtures thereof. Epsilon caprolactone is particularly preferred. The reaction products are preferably those of one mole of a hydroxyalkyl ester of an alpha, beta-unsaturated monocarboxylic acid and 1 to 5 mole, preferably on average 2 mole, of a lactone. The modification of the hydroxyl groups of the hydroxyalkyl esters with the lactone may take place before, during or after the copolymerization reaction has been carried out.

Examples of further suitable unsaturated monomers which, apart from an olefinic double bond, contain additional functional groups include (meth)acrylamides and derivatives thereof, (meth)acrylonitnlei silane functional unsaturated monomers such as, e.g., methacryloxypropyltrialkoxy silanes, vinyltrialkoxy silanes, in each case with, for example, 1 to 5 carbon atoms in the alkoxy radical, acetoacetyl-functional unsaturated monomers such as, e.g., acetoacetoxyethyl methacrylate, unsaturated monomers containing urea groups such as, e.g., ethylene urea ethyl methacrylate and unsaturated monomers containing amino groups such as, e.g., dialkylaminoethyl (meth)acrylates having, for example, 1 to 5 carbon atoms in the alkyl radical.

The preparation of the hydroxy-functional (meth)acrylic copolymers according to the invention may take place by radical copolymerization. This may be carried out in a manner known to the skilled person by conventional processes, e.g., bulk, solution or pearl polymerization, particularly by radical solution polymerization using radical initiators. Examples of suitable radical initiators are dialkyl peroxides, diacyl peroxides, hydroperoxides such as cumene hydroperoxide, peresters, peroxydicarbonates, perketals, ketone peroxides, azo compounds such as 2,2'-azo-bis-(2,4-dimethylvaleronitrile), azo-bis-isobutyronitrile, C-C-cleaving initiators such as, e.g., benzpinacol derivatives. The initiators may be used in amounts from 0.1 to 4.0 wt-%, for example, based on the initial monomer weight.

The solution polymerization process is generally carried out in such a way that the solvent is charged to the reaction vessel, heated to boiling point and the monomer/initiator mixture is metered in continuously over a particular period. Polymerization is carried out preferably at temperatures between 60° C. and 200° C. and more preferably at 130° C. to 180° C.

Examples of suitable organic solvents which may be used advantageously in solution polymerization and also later in the coating compositions according to the invention include: glycol ethers such as ethylene glycol dimethylether; propylene glycol dimethylether; glycol ether esters such as ethyl glycol acetate, butyl glycol acetate, 3-methoxy-n-butyl acetate, butyl diglycol acetate, methoxy propyl acetate, esters such as butyl acetate, isobutyl acetate, amyl acetate; ketones, such as methyl ethyl ketone, methyl isobutyl ketone, cyclohexanone, isophorone, aromatic hydrocarbons (e.g. with a boiling range from 136° C. to 180° C.) and aliphatic hydrocarbons.

Chain transfer agents such as, e.g., mercaptans, thioglycolates, cumene or dimeric alpha methylstyrene may be used to control the molecular weight.

Preferred (meth)acrylic copolymers according to the invention contain:

A) 5 to 60 wt-% of at least one olefinically unsaturated epoxy-functional monomer capable of radical polymerization,
B) 5 to 70 wt-% of at least one compound having a carboxyl group and at least one hydroxyl group selected from the group comprising hydroxymonocarboxylic acids, reaction products of hydroxymonocarboxylic acids and lactones, reaction products of hydroxymonocarboxylic acids and acid anhydrides which are reacted in a further reaction with epoxy-functional monomers, and mixtures of the above-mentioned compounds, and
C) 5 to 80 wt-% of at least one additional polymerizable olefinically unsaturated monomer selected from the following:
　C1) 0 to 60 wt-% of at least one alkyl (meth)acrylate,
　C2) 0 to 50 wt-% of at least one vinylaromatic hydrocarbon,
　C3) 0 to 30 wt-% of at least one hydroxy-functional olefinically unsaturated monomer,
　C4) 0 to 20 wt-% of at least one additional olefinically unsaturated monomer which is different from A) C1), C2) and C3), and
D) 0 to 50 wt-% of at least one lactone,
the sum of the proportions of components A), B), C1), C2), C3), C4) and D) being 100 wt-%.

Particularly preferred (meth)acrylic copolymers according to the invention are those containing:

A) 5 to 60 wt-% of at least one olefinically unsaturated epoxy-functional monomer capable of radical polymerization,
B) 5 to 70 wt-% of at least one compound having a carboxyl group and at least one hydroxyl group which is a reaction product of hydroxymonocarboxylic acids and lactones,
C) 5 to 80 wt-% of at least one additional polymerizable olefinically unsaturated monomer selected from the following:
　C1) 0 to 50 wt-% of at least one alkyl (meth)acrylate,
　C2) 0 to 40 wt-% of at least one vinylaromatic hydrocarbon,
　C3) 0 to 20 wt-% of at least one hydroxy-functional olefinically unsaturated monomer, the sum of the proportions of A), B), C1), C2) and C3) being 100 wt-%.

Particularly preferred (meth)acrylic copolymers according to the invention are also those containing:

A) 5 to 60 wt-% of at least one olefinically unsaturated epoxy-functional monomer capable of radical polymerization,
B) 5 to 70 wt-% of at least one compound having a carboxyl group and at least one hydroxyl group which is ahydroxymonocarboxylic-acid,
C) 5 to 80 wt-% of at least one additional polymerizable olefinically unsaturated monomer selected from the following:
　C1) 0 to 50 wt-% of at least one alkyl (meth)acrylate,
　C2) 0 to 40 wt-% of at least one vinylaromatic hydrocarbon,
　C3) 0 to 20 wt-% of at least one hydroxy-functional olefinically unsaturated monomer, and
D) 1 to 50 wt-%, preferably 1 to 30 wt-% of at least one lactone, the sum of the proportions of A), B), C1), C2), C3) and D) being 100 wt-%.

Particularly preferred components A) are for example glycidyl (meth)acrylates. Examples of particularly preferred components B) are for example 12-hydroxystearic acid, hydroxypivalic acid, ricinoleic acid, dimethylol propionic acid and 6-hydroxycaproic acid and reaction products of dimethylol propionic acid with epsilon caprolactone and of hydroxypivalic acid with epsilon caprolactone. Preferred components C1) are for example butyl (meth)acrylate, a preferred component C2) is for example styrene and preferred components C3) are for example 2-hydroxyethyl (meth)acrylate. Component D) used in particular preference is epsilon caprolactone.

Hydroxy-functional (meth)acrylic copolymers used in particular preference are those which contain, as component B), reaction products of hydroxymonocarboxylic acids and lactones and those which contain, as component B), hydroxymonocarboxylic acids in which at least a part of the hydroxyl groups introduced into the hydroxy-functional (meth)acrylic copolymer by means of the hydroxymonocarboxylic acids is modified in a secondary reaction with lactones (component D). Naturally, the compounds, which may be used as component B) may in each case generally, be used on their own or in combination.

The preparation of the hydroxy-functional (meth)acrylic copolymers according to the invention may take place in various ways. Preferably, a copolymer is prepared from component A) and component C). According to a first embodiment, the preparation may involve initially preparing an epoxy-functional (meth)acrylic copolymer from components A) and C), which is then reacted with component B). The epoxy-functional (meth)acrylic copolymers prepared from components A) and C) by radical copolymerization preferably have an OH value from 0 to 130, preferably from 0 to 80 mg KOH/g, a calculated epoxy equivalent weight from 142 to 2800 g/mole, preferably from 230 to 980 g/mole and a number-average molecular weight (Mn) from 1500 to 10000 g/mole, preferably from 2000 to 5000 g/mole.

The reaction of the epoxy-functional (meth)acrylic copolymers obtained in the first stage by radical copolymerization with compounds having a carboxyl group and at least one hydroxyl group (component B) takes place generally at temperatures from 60° C. to 200° C., preferably at 120° C. to 180° C. The equivalent ratio of epoxy groups to carboxyl groups may be, for example, 1:2 to 2:1, preferably 1:1 to 1:0.92. The reactants should be used in such a way that an epoxy equivalent weight of more than 6000 and an acid value of less than 10 is preferably obtained.

Another possibility of preparing the hydroxy-functional (meth)acrylic copolymers according to the invention involves providing a charge of the compounds having a carboxyl group and at least one hydroxyl group (component B) and then polymerizing the olefinically unsaturated monomers (components A) and C) in the presence of said component.

A third possibility of preparing the hydroxy-functional (meth)acrylic copolymers according to the invention involves initially reacting at least a part of the epoxy-functional unsaturated monomers (component A) with at least part of the compounds having a carboxyl group and at least one hydroxyl group (component B) to obtain a preliminary product followed by polymerization with further unsaturated monomers (component C) and optionally remaining epoxy-functional unsaturated monomers (component A). The hydroxy-functional (meth)acrylic copolymer optionally still containing epoxy functions may then be reacted with optionally present residual amounts of component B).

A fourth possibility of preparing the hydroxy-functional (meth)acrylic copolymers according to the invention again involves initially preparing an epoxy-functional (meth)acrylic copolymer from components A) and C) and then reacting this with compounds having a carboxyl group and at least one hydroxyl group (component B), wherein substantially only hydroxymonocarboxylic acids are used as component B) in the latter stage. The hydroxyl groups of the hydroxy-functional (meth)acrylic copolymers thus obtained are then modified at least partially with lactones (component D) and/or acid anhydrides. The third possibility of preparing the hydroxy-functional (meth)acrylic copolymers according to the invention may also be modified in a similar way, again by using substantially only hydroxymonocarboxylic acids as component B) and then modifying the hydroxyl groups of the hydroxy-functional (meth)acrylic copolymers obtained at least partially with lactones (component D) and/or acid anhydrides.

Optionally, catalysts may be used for the reaction of the epoxy groups of the epoxy-functional (meth)acrylic copolymers with the carboxyl groups of component B). Examples of catalysts are metal hydroxides such as, e.g., lithium hydroxide, potassium hydroxide, sodium hydroxide and quaternary ammonium salts such as, e.g., alkylbenzyldimethyl ammonium chloride, benzyltrimethyl ammonium chloride, methyltrioctyl ammonium chloride and tetraethyl ammonium bromide.

Antioxidants may also be added to the (meth)acrylic copolymers according to the invention, e.g., phosphorus compounds such as phosphites or phosphonates.

Solvent-based coating compositions may be prepared from the hydroxy-functional (meth)acrylic copolymers according to the invention. The coating compositions may contain one or more cross-linking agents for the hydroxy-functional (meth)acrylic copolymers. Depending on the type of cross-linking agents, one-component or two-component coating compositions may be prepared. The invention also relates, therefore, to coating compositions, which contain the hydroxy-functional (meth)acrylic copolymers according to the invention and optionally at least one cross-linking agent component. As a suitable cross-linking agent component compounds having groups which are reactive towards hydroxyl groups may be used. For example, these may be polyisocyanates having free isocyanate groups, polyisocyanates having at least partially blocked isocyanate groups, aminoresins and/or tris-(alkoxycarbonylamino)triazines, such as, e.g., 2,4,6-tris-(methoxycarbonylamino)-1,3,5-triazine and 2,4,6-tris-(butoxycarbonylamino)-1,3,5,-triazine.

Examples of the polyisocyanates include any organic polyisocyanates having aliphatically, cycloaliphatically, araliphatically and/or aromatically bound free isocyanate groups. The polyisocyanates are liquid at room temperature or liquefied by the addition of organic solvents. The polyisocyanates generally have a viscosity from 1 to 1 to 6,000 mPas at 23° C., preferably more than 5 and less than 3,000 mPas.

Polyisocyanates of this kind are known to the skilled person and described, for example, in DE-A 38 29 587 and DE-A 42 26 243.

The polyisocyanates are preferably polyisocyanates or polyisocyanate mixtures having exclusively aliphatically and/or cycloaliphatically bound isocyanate groups having an average NCO functionality from 1.5 to 5, preferably 2 to 4.

Particularly suitable examples are the so-called "coating polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane and the inherently known derivatives of said diisocyanates having biuret, allophanate, urethane and/or isocyanurate groups from which, after their preparation, excess starting diisocyanate is removed, preferably by distillation, to obtain a residual content of less than 0.5 wt-%. Triisocyanates such as nonane triisocyanate may also be used.

Sterically hindered polyisocyanates are also suitable. Examples thereof are 1,1,6,6-tetramethyl-hexamethylene diisocyanate, 1,5-dibutyl-penta-methyl diisocyanate, p-or m-tetramethylxylylene diisocyanate and the corresponding hydrogenated homologues.

In principle, diisocyanates may be reacted in the usual way to higher functionality compounds, for example, by trimerization or by reaction with water or polyols, such as, e.g., trimethylolpropane or glycerin.

The polyisocyanate cross-linking agents may be used on their own or in mixture. They are the conventional polyisocyanate cross-linking agents in the coating industry which are described comprehensively in the literature and are also available as commercial products.

The polyisocyanates may also be used in the form of isocyanate-modified resins.

Blocked or partially blocked polyisocyanates may also be used as the cross-linking component. Examples of blocked or partially blocked isocyanates are any di- and/or polyisocyanates in which the isocyanate groups or a part of the isocyanate groups have been reacted with compounds containing active hydrogen. Di-and/or polyisocyanates used may also be corresponding prepolymers containing isocyanate groups. These are, for example, aliphatic, cycloaliphatic, aromatic, optionally also sterically hindered polyisocyanates, as already described above. Trivalent aromatic and/or aliphatic blocked or partially blocked isocyanates having a number average molecular mass of, e.g., 500 to 1,500 are preferred. Low molecular weight compounds containing acid hydrogen are well known for blocking NCO groups. Examples thereof are aliphatic or cycloaliphatic alcohols, dialkylamino alcohols, oximes, lactams, imides, hydroxyalkyl esters, malonates or acetates.

Amino resins are also suitable as cross-linking agents. These resins are prepared according to the prior art and are supplied by many companies as sales products. Examples of such amino resins include amine-formaldehyde condensation resins, which are obtained by reaction of aldehydes with melamine, guanamine, benzoguanamine or dicyandiamide. The alcohol groups of the aldehyde condensation products are then etherified partially or wholly with alcohols.

More particularly, cross-linking agents used are polyisocyanates having free isocyanate groups and polyisocyanates having blocked isocyanate groups, the latter optionally in combination with melamine resins.

The coating compositions may contain additional hydroxy-functional binders apart from the hydroxy-functional (meth)acrylic copolymers according to the invention. For example, the additional hydroxy-functional binders may be hydroxy-functional binders well known to the skilled person, of the kind used for the formulation of solvent-based coating compositions. Examples of additional suitable hydroxy-fuinctional binders include hydroxy-functional polyester, alkyd, polyurethane and/or poly(meth) acrylic resins which are different from the (meth)acrylic copolymers according to the invention. The additional hydroxy-functional binders may also be present in the modified form, e.g., in the form of (meth)acrylated polyesters or (meth)acrylated polyurethanes. They may be used on their own or in a mixture. The proportion of additional hydroxy-functional binders may be 0 to 50 wt-%, for example, based on the amount of hydroxy-functional (meth) acrylic copolymers used according to the invention. The coating compositions may also contain low molecular weight reactive components, so-called reactive diluents that are capable of reacting with the cross-linking agent components in question. Examples of these include hydroxy- or amino-functional reactive diluents.

The hydroxy-functional (meth)acrylic copolymers and the corresponding cross-linking agents are used in each case in such quantity ratios that the equivalent ratio of hydroxyl groups of the (meth)acrylic copolymers to the groups of cross-linking agent components which are reactive towards hydroxyl groups is 5:1 to 1:5, for example, preferably 3:1 to 1:3, particularly preferably 1.5:1 to 1:1.5. If further hydroxy-functional binders and reactive thinners are used, their reactive functions should be taken into consideration when calculating the equivalent ratio.

The coating compositions according to the invention contain organic solvents. The solvents may originate from the preparation of the binders or they may be added separately. They are organic solvents typical of those used for coatings and well known to the skilled person, for example, those already mentioned above for the preparation of solution polymers.

The coating compositions according to the invention may contain pigments and/or fillers. Suitable pigments are all the conventional colour-imparting and/or special effect-imparting coating pigments of an organic or inorganic nature. Examples of inorganic or organic coloured pigments are titanium dioxide, micronized titanium dioxide, iron oxide pigments, carbon black, azo pigments, phthalocyanine pigments, quinacridone or pyrrolopyrrole pigments. Examples of special-effect pigments are metal pigments, e.g. of aluminium or copper, interference pigments such as, e.g., titanium dioxide-coated aluminum, coated mica, graphite effect pigments and iron oxide flake Examples of fillers are silica, barium sulfate, talc, aluminum silicate, magnesium silicate.

The coating compositions may contain conventional coating additives. The additives are the conventional additives, which may be used, in the coating sector. Examples of such additives include light protecting agents, e.g., based on benzotriazoles and HALS compounds (hindered amine light stabilizers), leveling agents based on (meth)acrylic homopolymers or silicone oils, rheology-influencing agents such as fine-particle silica or polymeric urea compounds, thickeners such as partially cross-linked polycarboxylic acid or polyurethanes, anti-foaming agents, wetting agents, curing accelerators for the cross-linking reaction of the OH-functional binders, for example, organic metal salts such as dibutyltin dilaurate, zinc naphthenate and compounds containing tertiary amino groups such as triethylamine for the cross-linking reaction with polyisocyanates. The additives are used in conventional amounts known to the skilled person.

Transparent or pigmented coating compositions may be prepared. In order to prepare transparent coating compositions, the individual constituents are mixed together in the usual manner and homogenized or dispersed thoroughly. In order to prepare pigmented coating compositions, the individual constituents are mixed together and homogenized or milled in the usual way. For example, the procedure may be such that initially a part of the hydroxy-functional (meth)acrylic copolymers according to the invention and optionally additional hydroxy-functional binders are mixed with the pigments and/or fillers and conventional coating additives and solvents and milled or dispersed in conventional equipment. The resulting ground stock is then completed with the remaining amount of binder.

Depending on the type of cross-linking agents, one-component or two-component coating compositions may be formulated with the binders according to the invention. If polyisocyanates having free isocyanate groups are used as cross-linking agents, the systems are two-component, i.e., the hydroxyl group-containing binder component, optionally with pigments, fillers and conventional coating additives, and the polyisocyanate component may be mixed together only shortly before application. In principle, the coating compositions may be adjusted with organic solvents to spray viscosity before application.

The coating compositions according to the invention may be applied by known methods, particularly by spraying. The coatings obtained may be cured at room temperature or by forced drying at higher temperatures, e.g., up to 80° C., preferably at 20° C. to 60° C. They may also, however, be cured at higher temperature from, for example, 80° C. to 160° C.

The coating compositions according to the invention are suitable for automotive and industrial coating. In the automotive coating sector the coating agents may be used both for OEM (Original Equipment Manufacture) automotive coating and for automotive and automotive part refinishing. Stoving or baking temperatures from 60° C. to 140° C., for example; preferably from 110° C. to 130° C., are used for standard automotive coating. Curing temperatures from 20° C. to 80° C., for example, particularly from 40° C. to 60° C. are used for automotive refinishing.

The coating compositions according to the invention may be formulated, for example, as pigmented top coats or as transparent clear coats and used for the preparation of the outer pigmented top coat layer of a multi-layer coating or for the preparation of the outer clear coat layer of a multi-layer coating. The present invention also relates, therefore, to the use of the coating compositions according to the invention as a top coat coating composition and as a clear coat coating composition, and to a process for the preparation of multi-layer coatings, wherein in particular the pigmented top coat and transparent clear coat layers of multi-layer coatings are produced by means of the coating compositions according to the invention.

The coating compositions may be applied as a pigmented topcoat layer, for example, to conventional 1-component or 2-component primer surfacer layers. The coating compositions according to the invention may also, however, be applied as a primer surfacer layer, for example, to conventional primers, e.g., 2-component epoxy primers or to electrodeposition primers.

The coating compositions may be applied as transparent clear coat coating compositions, for example, by the wet-in wet method, to solvent-based or aqueous colour-and/or special effect-imparting base coat layers. In this case, the colour- and/or special effect-imparting base coat layer is applied to an optionally pre-coated substrate, particularly pre-coated vehicle bodies or parts thereof, before the clear coat coating layer of the clear coat coating compositions according to the invention is applied. After an optional flash-off phase, both layers are then cured together. Within the context of OEM automotive coating, flash-off may be carried out, for example, at 20° C. to 80° C. and within the context of refinishing over a period of 15 to 45 minutes at ambient temperature, depending on the relative humidity.

The curing temperatures depend on the field of application and/or the binder/cross-linking agent system used.

Clear coat and topcoat coating compositions with a high solids content may be formulated with the binders according to the invention. The binders according to the invention and the coating compositions prepared from them may be used within the context of a multi-layer coating to prepare top coat layers and clear coat layers with good scratch resistance and good chemical and acid resistance. Similarly, the binders according to the invention and the coating compositions prepared from them may be used within the context of a base coat/clear coat two-layer coating to prepare clear coat layers which do not bring about partial dissolution of the base coat layer.

The invention will be explained in more detail on the basis of the examples below. All parts and percentages are on a weight basis unless otherwise indicated.

EXAMPLES

Example 1

Preparation of a Hydroxy-functional (Meth)acrylic Copolymer A

A 4 liter three-necked ground glass flask fitted with an agitator, contact thermometer, dropping funnel and spherical condenser is charged with 500 parts by weight of solvent naphtha (onset of boiling: 164° C.) and heated to 155° C. with stirring and reflux cooling. A monomer mixture of 780.0 parts by weight of butyl acrylate, 325.0 parts by weight of styrene, 177.5 parts by weight of glycidyl methacrylate, 50.0 parts by weight of solvent naphtha and 25.0 parts by weight of di-tert.-butyl peroxide was added continuously from the dropping funnel over a period of 5 hours. After the addition, the monomer-mixing vessel and the dropping funnel were rinsed with 75 parts by weight of solvent naphtha and the contents added to the reaction mixture. The reaction mixture was then cooled to 145° C. and 155 parts by weight of dimethylol propionic acid were added. The reaction mixture was then heated again to 155° C. and after the set temperature had been reached the mixture was held at this temperature for 30 minutes. 162.5 parts by weight of epsilon caprolactone were then added over a period of one hour. The dropping funnel was rinsed with 100 parts by weight of solvent naphtha. Post-polymerization was then carried out for 3 hours at 155° C. The mixture was then cooled to 125° C., diluted with 125 parts by weight of butyl acetate 98/100 and diluted with 25 parts by weight of solvent naphtha to a solids content of about 64%.

The resulting polymer solution had a solids content of 63.5% (1h, 125° C.), and a viscosity of 770 mPas/25° C. and a OH value of 120 mg KOH/g, and the polymer had a lactone content of 10 wt-% and a number average molecular mass (Mn) of 9300 g/mole.

Example 2

Preparation of a Hydroxy-functional (Meth)acrylic Copolymer B

A 4 liter three-necked, ground glass flask fitted with an agitator, contact thermometer, dropping funnel and spherical condenser was charged with 500 parts by weight of solvent naphtha (onset of boiling 164° C.) and heated to 155° C. with stirring and reflux cooling. A monomer mixture of 837.5 parts by weight of butyl acrylate, 350.0 parts by weight of styrene, 177.5 parts by weight of glycidyl methacrylate, 50.0 parts by weight of solvent naphtha and 25.0 parts by weight of di-tertiary-butyl peroxide was added continuously from the dropping funnel over a period of 5 hours. After the addition, the monomer-mixing vessel and the dropping funnel were rinsed with 75 parts by weight of solvent naphtha and the contents added to the reaction mixture. The reaction mixture was then cooled to 145° C. and 155 parts by weight of dimethylol propionic acid were added. The reaction mixture was then heated again to 155° C. and after the set temperature was reached this temperature was held for 30 minutes. 80.0 parts by weight of epsilon caprolactone were then added over a period of 1 hour. The dropping funnel was rinsed with 100 parts by weight of solvent naphtha. Post-polymerization was then carried out for 3 hours at 155° C. The mixture was then cooled to 125° C., diluted with 125 parts by weight of butyl acetate 98/100 and diluted with 25 parts by weight of solvent naphtha to a solids content of about 64%.

The resulting polymer solution had a solids content of 64.4% (1 h, 125° C.) and a viscosity of 1010 mPas/25° C.

Example 3

Preparation of a Hydroxy-functional (Meth)acrylic Copolymer C

A 4 liter three-necked, ground glass flask fitted with an agitator, contact thermometer, dropping funnel and spherical condenser was charged with 600 parts by weight of solvent naphtha (onset of boiling 164° C.) and heated to 147° C. with stirring and reflux cooling. A monomer mixture of 475.0 parts by weight of butyl methacrylate, 345.0 parts by weight of butyl acrylate, 162.5 parts by weight of styrene, 177.5 parts by weight of glycidyl methacrylate, 167.5 parts by weight of 2-hydroxypropyl methacrylate, 50.0 parts by weight of solvent naphtha, 25.0 parts by weight of di-tert.-butyl peroxide and 20.0 parts by weight of dicumyl peroxide was added continuously from the dropping funnel over a period of 6 hours. After the addition, the monomer-mixing vessel and the dropping funnel were rinsed with 75 parts by weight of solvent naphtha and the contents added to the reaction mixture. The reaction mixture was then cooled to 145° C. and 155 parts by weight of dimethylol propionic acid were added. The reaction mixture was then heated again to 155° C. and after the set temperature was reached this temperature was held for 30 minutes. 97.5 parts by weight of epsilon caprolactone were then added over a period of one hour. The dropping funnel was rinsed with 75 parts by weight of solvent naphtha. Post-polymerization was then carried out for 3 hours at 155° C. The mixture was then cooled to 111° C., diluted with 25 parts by weight of n-butanol and diluted with 25 parts (by weight) of solvent naphtha to a solids content of about 64%.

The resulting solution had a solids content of 64.2% (1 h, 125° C.) and a viscosity of 1040 mPas/25° C.

Example 4

Preparation of a Hydroxy-functional (Meth)acrylic Copolymer D

Example 4.1

Glycidyl-functional Acrylic Prepolymer

A 6 liter glass flask equipped with a stirrer, thermometer and condenser was charged with 800 grams of xylene and heated to reflux. (140° C.) A mixture of 1036 grams styrene, 1036 grams 2-ethylhexyl methacrylate. 728 grams of glycidyl methacrylate, 120 grams of t-butyl peroxy 2-ethylhexanoate (Trigonox 21S from Akzo) and 200 grams of xylene was added dropwise at a uniform rate over 5 hours while keeping reflux. After the addition, 40 grams of xylene were added to rinse the addition funnel and the reactor contents were held another 30 minutes at reflux. Finally 40 grams of xylene were added.

The resulting polymer solution had a solids content of 71.4% and a viscosity of Z3+½ (Gardner-holdt) and the polymer had a Mn of 5800 and a Mw of 10500.

Example 4.2

Hydroxy-functional (Meth)acrylic Copolymer D

In a 10 liter reactor equipped as described in Example 4.1., 4000 grams of the glycidyl functional acrylic prepolymer from Example 4.1. were reacted at reflux with 126 grams of dibutyl tin dilaurate, 1536 grams of 12-hydroxy stearic acid and 1014 grams of butylacetate till the acid value was below 2.

The resulting polymer solution had a solids content of 77.6% and a viscosity of Z4-(Gardner-holdt) and the polymer had a Mn of 4300 and Mw of 17300.

Example 5

Preparation of a Hydroxy-functional (Meth)acrylic Copolymer E

Example 5.1

Glycidyl Functional Prepolymer.

In a 6 liter reactor equipped as in Example 1, 800 grams of Solvesso 100 (Exxon) were heated to about 165° C. reflux. Over a period of 5 hours, a mixture of 1690 grams styrene, 910 grams glycidyl methacrylate, 60 grams of di-tertiary-butylperoxide and 340 grams of Solvesso 100 was added uniformly. The addition funnel was rinsed with 40 grams of Solvesso 100 and the reactor contents held for another one hour at reflux. Finally 160 grams of Solvesso 100 were added The resulting polymer solution had a solids content of 67.6% and a viscosity of Z4+½ (Gardner-holdt) and the polymer had a Mn of 2900 and a Mw of 7100.

Example 5.2

Hydroxy-Functional (Meth)acrylic Copolymer E.

Following the procedure of Example 4.2. 4000 grams of glycidyl-functional prepolymer of Example 5.1. were reacted with 1920 grams 12-hydroxystearic acid and 1000 grams of butylacetate.

The resulting polymer solution had a solids content of 68.5%, a viscosity of Y+½ (Gardner holdt), an acid value of 3.7 and the polymer had a Mn 5100 and a Mw 13000.

Example 6

Preparation of a Hydroxy-functional (Meth)acrylic Copolymer F

Example 6.1

Hydroxy-acid Functional Intermediate

In a reactor equipped as described in Example 4.1. 536 grams of dimethylol propionic acid were reacted with 2736 grams of epsilon caprolactone and 6 grams of dibutyl tin dilaurate.

The resulting polymer had a Mn of 1250 and a Mw 2700.

Example 6.2.

Hydroxy-functional (Meth)acrylic Copolymer F

In a reactor equipped as in Example 4.2. 2000 grams of glycidyl-functional prepolymer from Example 5.1. were reacted with 2627.4 grams of the hydroxy-acid of Example 6.1. in the presence of 16.8 grams of tetraethylammonium bromide and 919.6 grams butylacetate.

The resulting polymer solution had a solids content of 71.8%, a viscosity of Z+⅓ (Gardner-holdt) and an acid value of 3.1 and the polymer had a Mn of 8500 and Mw of 27600.

Example 7 (Comparative Example)

A polymer was prepared without any epoxy functional olefinic unsaturated monomers and had a caprolactone content of 10 wt-% and an OH value of 120 mg KOH/g was prepared according to claim 1 of DE-OS 22 60 212.

A 4 liter three-necked ground glass flask fitted with an agitator, contact thermometer, dropping funnel and spherical condenser is charged with 500 parts by weight of solvent naphtha (onset of boiling 164° C.) and heated to 145° C. with stirring and reflux cooling. A monomer mixture of 150 parts by weight of epsilon caprolactone, 575 parts by weight of butyl acrylate, 150 parts by weight of styrene, 222.5 parts by weight of methyl methacrylate, 372.5 parts by weight of 2-hydroxyethyl acrylate, 30 parts by weight of solvent naphtha and 30 parts by weight of di-tertiary-butyl peroxide was added continuously from the dropping funnel over a period of 6 hours. After the addition, the monomer-mixing vessel and the dropping funnel were rinsed with 70 parts by weight of solvent naphtha and the contents added to the reaction mixture. Post-polymerization was then carried out for 3 hours at 145° C.

The mixture was then cooled to 111° C. and diluted with 400 parts by weight of n-butyl acetate to a solids content of about 60%.

The resulting polymer solution had a solids content of 58.3% (1 h, 125° C.), a viscosity of 265 mPas/25° C. and the polymer had a number average molecular mass (Mn) of 9400 g/mole.

Example 8

Preparation of a Hydroxy Functional (Meth)acrylic Copolymer G

Example 8.1

Hydroxy-acid Functional Intermediate

In a reactor equipped as described in Example 1, 340 grams of dimethlol propionic acid were reacted with 2280 grams of epsilon caprolactone and 0.18 grams of dibutyl tin dilaurate in 1549.82 grams butylacetate. This adduct solidifies at room temperature and was used further in Example 8.

Example 8.2

Hydroxy Functional (Meth)acrylic Polymer G

In a reactor equipped as in Example 1,2000 grams of glycidyl functional acrylic prepolymer from Example 5.1. were reacted with 1656 grams of the above hydroxy-acid functional intermediate of Example 8.1. in the presence of 8 grams of tetraethylammonium bromide and 120 grams butylacetate.

The resulting hydroxy functional acrylic polymer has a hydroxyl value of 216 and about 30% caprolactone on polymer weight composition grafted on the ackbone.

The resulting polymer solution had a solids content of 70%, a viscosity of Z3-⅓ (Gardner-holdt) and an acid value of 3.7 and the polymer had a Mn of 3000 and Mw of 12500.

Example 9 (Comparative Example)

A caprolactone grafted acrylic polymer was prepared using the technique known in the prior art by reacting caprolactone with a hydroxy functional monomer. The overall weight % caprolactone was 30% on polymer and the hydroxyl value was 216. In a reaction flask equipped as Example 5.1. 494 grams of hydroxypropyl methacrylate; 442 grams of styrene, 884 grams of hydroxyethylmethacrylate, 780 grams of caprolactone, 42 grams of di-tertiary-butylperoxide and 118 grams of Solvesso 100 were added and then 799.94 grams of Solvesso 100 and 0.06 grams of dibutyl tin dilaurate were added and held at reflux temperature for 5 hours. 40 grams of Solvesso 100 were added next as a rinsing step that was followed by a 1 hour hold at reflux temperature. Next 8.4 grams of tetraethylammonium bromide were added dissolved in 71.6 grams of butylacetate and the batch was held for about 3 hours until a constant viscosity was reached.

The resulting polymer solution was cloudy and had a solids content of 66.7%, a viscosity of Z1+⅓ (Gardner-holdt) and an acid value of 4.4 and the polymer had a Mn of 2300 and a Mw 6300.

Example 10

The two components of a clear coat based on a hydroxy-functional (meth)acrylic copolymer A according to Example 1 and a polyisocyanate cross-linking agent were prepared as follows:

Component I 97.43 parts by weight of the copolymer A solution from Example 1 were mixed homogeneously with 1.00 part by weight of a 1% silicone oil solution in xylene, 0.6 parts by weight of a light protecting agent of the benzotriazole type and 0.6 parts by weight of a light protecting agent of the HALS type, 0.32 parts by weight of diethyl ethanolamine and 0.05 parts by weight of a 10% dibutyl tin laurate solution in butyl acetate.

Component II

An isocyanate curing agent solution was prepared as follows:

9.0 parts by weight of xylene, 25.0 parts by weight of butyl acetate, 10.0 parts by weight of solvent naphtha, 2.6 parts by weight of methoxypropyl acetate, 53.3 parts by weight of a commercially available polyisocyanate (Desmodura 3300/Bayer) and 0.1 part by weight of a 10% dibutyl tin laurate solution in butyl acetate were mixed homogeneously to obtain the solution of curing agent.

Example 11 (Comparative Example)

The two components of a clear coat based on a hydroxy-functional (meth)acrylic copolymer according to Example 7 (Comparative Example) and a polyisocyanate cross-linking agent were prepared.

For Component I, the process of Example 10 is followed in an analogous way, whereby the copolymer A is replaced by the polymer of Example 7.

Component II is identical to Component II of Example 10.

Example 12

A clear coat based on a hydroxy-functional (meth)acrylic copolymer A according to Example 1 with a melamine resin cross-linking agent was prepared as follows:

48.3 parts by weight of the copolymer A from Example 1 were mixed homogeneously with 24.0 parts by weight of a commercially available 60% butylated melamine resin (Luwipal® 012/BASF), 0.6 parts by weight of a light protecting agent of the benzotriazole type, 0.6 parts by weight of a light protecting agent of the HALS type and 1.0 part by weight of a 34% solution of a blocked p-toluene sulfonic acid catalyst in a isopropanol/water mixture (89:11).

Example 13 (Comparative Example)

A clear coat based on a hydroxy-functional (meth)acrylic copolymer according to Example 7 (Comparative Example) with melamine resin cross-linking agent was prepared.

The process of Example 10 is followed in an analogous way, whereby the copolymer A is replaced by the comparative resin.

Application of the Coating Compositions from Example 10 and 11

Body steel sheets pre-coated with commercial cathodic electrodeposition coating (18 μm) and commercial primer surfacer (35 μm) used in OEM automotive coating were coated with commercial solvent-based metallic base coat in a dry film having a thickness of 15 μm. In each case, the wet films were pre-dried for 30 minutes at room temperature. The clear coats from Example 10 and 11 were applied wet-on-wet directly afterwards after mixing Component I with Component II, the isocyanate curing agent solution, in a volume ratio of 2:1 by spray application in a dry film thickness of 35 μm and hardened for 30 minutes at 60° C. after 10 minutes flash-off at room temperature.

Application of the Coating Compositions from Example 12 and 13

Body steel sheets pre-coated with commercial cathodic electrodeposition paint (18 μm) and commercial primer surfacer (35 μm) used in OEM automotive coating were coated with commercial-solvent based metallic base coat to form a dry film having a thickness of 15 μm. In each case, the wet films were pre-dried for 6 minutes at 80° C. The clear coats from Example 12 and 13 were applied wet-on-wet directly afterwards by spray application in a dry film thickness of 35 μm and baked for 20 minutes at 140° C. after 5 minutes flash-off at room temperature.

| Coating results: | | |
|---|---|---|
| Clear coat: | Example 10 | Example 11 |
| Sulfuric acid test: | | |
| Etching: | 18 min | 14 min |
| Base coat attack: | >30 min | 28 min |
| Scratch resistance | | |
| Initial gloss | 89% | 88% |
| Final gloss | 74% | 70% |
| Residual gloss | 83% | 80% |
| Partial dissolution of the base coat | 0 | 1 |
| Clear coat: | Example 12 | Example 13 |
| Sulfuric acid test: | | |
| Etching: | 8 min | 6 min |
| Base coat attack: | 24 min | 23 min |

| -continued | | |
|---|---|---|
| Coating results: | | |
| Scratch resistance | | |
| Initial gloss | 90% | 89% |
| Final gloss | 60% | 56% |
| Residual gloss | 67% | 63% |
| Partial dissolution of the base coat | 0 | 1 |

Methods of Determination:

Acid Resistance:

The dripping-test with 10% sulfuric acid was used to test the clear coats for acid resistance. The test sheets were positioned on a heatable plate and heated to 60° C. It must be ensured here that the sheets rest on the plate in a flat manner in order to obtain optimal temperature transmission. At the end of the heating-up phase, i.e. at 60° C., one drop per minute is applied to the clear coat surface. The total time is 30 minutes. At the end of the testing time the coatings are rinsed with distilled water. If necessary, a brush can additionally be used for the cleaning.

In order to evaluate the acid resistance, the exposure time, at which the first visible deterioration (etching) and the base coat attack occurred, is given in minutes.

Scratch Resistance:

The travelling block method with the Erichsen-Peters block, type no. 265 was used to test the coatings for scratch resistance. The dimensions are 75×75×50 mm, base area= 3750 mm². The weight is 2 kg. A 2.5 mm thick wool felt, dimensions 30×50 mm, is bonded beneath the abrasive block with Velcro tape. Then 1 g of a water-soluble grinding paste is distributed evenly onto the bearing surface. The block travels to and fro 10 times over a period of 9 seconds. The to and fro movement takes place parallel to the 75 mm edge of the block, the abrasive path is 90 mm in one direction. The surface is then rinsed with cold water, dried and a gloss measurement carried out at an angle of 20 °.

The residual gloss remaining after the abrasive stress is given in percent as a measure of the scratch resistance of a coating.

$$\text{Residual gloss }(\%) = \frac{\text{Gloss after stress} \times 100}{\text{Gloss before stress}}$$

Partial Dissolution Behavior

The partial dissolution behavior of the base coat is assessed visually: 0=none 1=slight 2=moderate 3=considerable Example 10 (coating composition of the invention with polyisocyanate cross-linking agent) gave significantly better acid etch resistance and better scratch resistance in comparison to the coating composition of Example 11 which is representative of prior art compositions. Example 12 (coating composition of the invention with melamine resin cross-linking agent) gave better acid etch and scratch resistance in comparison to the coating composition of Example 13 which is representative of prior art compositions. The coating compositions of the invention (Example 10 and 12) further showed no partial dissolution of the base coats. In comparison the coating compositions of prior art (Example 11 and 13) showed slight partial dissolution of the base coats.

Example 14

A clear coat based on a hydroxy-functional (meth)acrylic copolymer G prepared according to Example 8.2, a standard clear coat and a comparative clear coat based on comparative hydroxy-functional (meth)acrylic copolymer prepared according to Example 9 were prepared using the same polyisocyanate cross-linking agent.

In the table below the compositions of three clear coats are given in which the standard clear coat is a commercial clear coat based on an acrylic copolymer in which no caprolactone is used. All clear coat formulations contained the same amount of binder solids. The three clear coats were activated with a commercial activator (polyisocyanate) based on Desmodur® 3390 (Bayer). Each of the clear coats were applied over blue commercial basecoats and baked for 30 minutes at 60°C.

TABLE

|  | Standard Clear Coat | Clear Coat Based on Example 8 | Comparative Clear Coat Based on Example 9 |
|---|---|---|---|
| Methyl isobutyl ketone | 4.47 | 13.82 | 12.93 |
| Primary amyl acetate | 2.36 | 7.29 | 6.83 |
| Ethyl 3-ethoxypropionate | 3.43 | 10.6 | 9.93 |
| Propylene glocol methylether acetate | 0.68 | 2.1 | 1.97 |
| Ethylene Glycol monobutylether | 1.73 | 5.34 | 5.01 |
| BYK 306 (polyether modified dimethyl polysiloxane) | 0.05 | 0.05 | 0.05 |
| BYK 332 (polyether modified dimethyl polysiloxane) | 0.05 | 0.05 | 0.05 |
| BYK 361 (polyacrylate copolymer) | 0.2 | 0.2 | 0.2 |
| D.B.T.D.L. (1% solution) dibutyl tin dilaurate) | 1.49 | 1.49 | 1.49 |
| Tinuvin ® 292 (hindered amine light stabilizer) | 0.3 | 0.3 | 0.3 |
| Tinuvin ® 1130 (benzotriazole UV absorber) | 0.6 | 0.6 | 0.6 |
| Diethylethanolamine | 0.25 | 0.25 | 0.25 |
| Acrylic resin standard | 83.29 | / | / |
| Acrylic resin Example 8 | / | 56.81 | / |
| Acrylic resin Comparative Example 9 | / | / | 59.29 |
| Acetic acid | 0.3 | 0.3 | 0.3 |
| Butylacetate | 0.8 | 0.8 | 0.8 |
|  | 100 | 100 | 100 |
| NCO/H ratio | 1.05 | 1.05 | 1.05 |
| Appearance | Clear | Clear | CLOUDY |
| Drying time: tape free initial | VP/F | VG/Ex | Not tested |
| Fischer hardness (init./1 week) | 0.2/13.4 | 0.56/11.0 | Not tested |
| Perzos hardness (init./1 week) | 55/310 | 53/179 | Not tested |
| Scratch (gloss before/after) | 89.8/18.2 | 88.1/61.7 | Not tested |

Test Methods used:

Drying

Standard metal panels (10×30 cm) are clear coated (50μ) and baked horizontally for 30 minutes at 60° C. After a 10 minutes cooldown period a strip of masking tape is applied across the panel, smoothing it out manually using moderate firm pressure to insure uniform contact. A 2 kg weight is rolled over the tape to and from. After 10 minutes the tape is removed and the degree of marking is observed. After 30 minutes recovery the tape imprint is evaluated again.

Ratings vary from VVP (very, very poor), VP (very poor), P (poor),F (fair), G (good), VG (very good) ad Ex (excellent).

Scratch Resistance

The clear coated panels are scratched after 7 days aging using the linear Gardner brush test (nylon brush) (according to ASTM D2486-89) through using an abrasive medium based on calcium carbonate. Each panel undergoes 30 brush cycles. The gloss before and after scratching is measured.

Summary of Results of Above Table:

The clear coat based on acrylic copolymer of comparative Example 9, where the same amount of caprolactone is used as in the acrylic copolymer of Example 8, is cloudy due to incompatability with the activator and is considered an unacceptable automotive clear coating. No additional tests were conducted on this unacceptable coating. The method of grafting caprolactone as claimed in this invention and shown in Example 8 allows for the formulation of a clear coat with excellent appearance in comparison to the clear coating, formulated from the copolymer of Example 9. The clear coating of the copolymer of Example 8 has a better property balance of drying time and scratching resistance when compared with a typical commercial standard clear coat.

What is claimed is:

1. Hydroxy-functional (meth)acrylic polymers having an OH value from 40 to 260 mg KOH/g and a number average molecular mass (Mn) from 1500 to 20000 g/mole, comprising components A) polymerized monomers of at least one epoxy-functional, olefinically unsaturated monomer, B) at least one compound having a carboxyl group and at least one hydroxyl group being reacted with the epoxy-functional group of the polymerized olefinic unsaturated monomers, C) at least one additional polymerized olefinically unsaturated monomer being different from component A) and D) optionally at least one lactone being reacted with the polymer.

2. Hydroxy-functional (meth)acrylic polymers according to claim 1, having an OH value from 80 to 220 mg KOH/g, a number average molecular mass (Mn) from 2000 to 15000 g/mole and a glass transition temperature Tg from −40° C. to 80° C.

3. Hydroxy-functional (meth)acrylic polymers according to claim 1, comprising 1–90 wt-% of component A), 1–80 wt-% of component B) and 5–80 wt-% of component C), the proportions by weight of components A), B) and C) totaling 100 wt-%.

4. Hydroxy-functional (meth)acrylic polymers according to claim 1, comprising 1–90 wt-% of component A), 1–80 wt-% of component B), 5–80 wt-% of component C) and 2 to 50 wt-% of component D), the proportions by weight of components A), B), C) and D) totaling 100 wt-%.

5. Hydroxy-functional (meth)acrylic polymers according to claim 1, in which component A) consists of glycidyl (meth)acrylate.

6. Hydroxy-functional (meth)acrylic polymers according to claim 1, in which component B) is selected from the group consisting of hydroxymonocarboxylic acids, reaction products of hydroxymonocarboxylic acids and lactones, reaction products of hydroxymonocarboxylic acids and acid anhydrides which are reacted in a further reaction with epoxy-functional compounds, and mixtures of the said compounds.

7. Hydroxy-functional (meth)acrylic polymers according to claim 3 in which component C) comprises C1) 0 to 60 wt-% of at least one alkyl (meth)acrylate, C2) 0 to 50 wt-% of at least one vinylaromatic hydrocarbon, C3) 0 to 30 wt-% of at least one hydroxy-functional olefinically unsaturated monomer, C4) 0 to 20 wt-% of at least one further olefmically unsaturated monomer which is different from C1), C2) and C3), and the sum of the proportions of A), B), C1), C2), C3) and C4) being 100 wt-%.

8. Hydroxy-functional (meth)acrylic polymers according to claim 4 in which component C) comprises C1) 0 to 60 wt-% of at least one alkyl (meth)acrylate, C2) 0 to 50 wt-% of at least one vinylaromatic hydrocarbon, C3) 0 to 30 wt-% of at least one hydroxy-functional olefinically unsaturated monomer, C4) 0 to 20 wt-% of at least one further olefinically unsaturated monomer which is different from C1), C2) and C3), and the sum of the proportions of A), B), C1), C2), C3) C4) and D) being 100 wt-%.

9. Process for the preparation of the hydroxy-functional (meth)acrylic polymers according to claim 1, wherein the epoxy-functional (meth)acrylic polymer is prepared by radical polymerization of component A) and component C), and in which the polymer is further reacted with component B), the reaction with component B) taking place before, during and/or after the polymerization reaction.

10. Process for the preparation of the hydroxy-functional (meth)acrylic polymers according to claim 1, wherein the epoxy-functional (meth)acrylic polymer is prepared by radical polymerization of component A) and component C), and in which the polymer is further reacted with component B) and then with component D), the reaction with component B) taking place before, during and/or after the polymerization reaction.

11. A coating composition containing the hydroxy-functional (meth)acrylic polymer of claim 1.

12. A coating compositions of claim 11, additionally containing at least one cross-linking agent.

13. A coated substrate coated with a multi-layer coating wherein at least one layer comprises the coating compositions of claim 11.

14. A coated substrate with a multilayer coating having a clear top layer of the coating composition of claim 11.

15. A coated substrate with a multilayer coating having a pigmented topcoat of the coating composition of claim 11.

16. The coated substrate of claim 13 in which the substrate is an automotive body or an automotive part.

* * * * *

UNITED STATES PATENT AND TRADEMARK OFFICE
CERTIFICATE OF CORRECTION

PATENT NO.    : 6,652,971 B1
DATED         : November 25, 2003
INVENTOR(S)   : Ann Delmotte et al.

It is certified that error appears in the above-identified patent and that said Letters Patent is hereby corrected as shown below:

Column 20,
Line 64, "olefmically" should be -- olefinically --.

Signed and Sealed this

Twentieth Day of July, 2004

JON W. DUDAS
*Acting Director of the United States Patent and Trademark Office*